United States Patent
Tanaka

(10) Patent No.: US 6,252,601 B1
(45) Date of Patent: Jun. 26, 2001

(54) TETRAHEDRAL MESH GENERATION AND RECORDING MEDIUM STORING PROGRAM THEREFOR

(75) Inventor: Katsuhiko Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/157,369

(22) Filed: Sep. 21, 1998

(30) Foreign Application Priority Data

Sep. 19, 1997 (JP) .................................................. 9-273922

(51) Int. Cl.⁷ .................................................. G06T 15/00
(52) U.S. Cl. .......................................... 345/423; 345/419
(58) Field of Search .................................. 345/418, 419, 345/423, 424, 425

(56) References Cited

U.S. PATENT DOCUMENTS

| | | | |
|---|---|---|---|
| 6,108,006 | * 8/2000 | Hoppe | 345/423 |
| 6,121,973 | * 9/2000 | Itoh et al. | 345/423 |
| 6,124,857 | * 9/2000 | Itoh et al. | 345/423 |
| 6,147,688 | * 11/2000 | Clair | 345/423 |
| 6,151,027 | * 11/2000 | Yoo | 345/423 |

FOREIGN PATENT DOCUMENTS 7-121579   5/1995 (JP) .
8-329284   12/1996 (JP) .

OTHER PUBLICATIONS

M.S. Mock, "Tetrahedral elements and the Scharfetter–Gummel method", *Proc. NASECODE IV*, Jun., 1985, pp. 36–47.

P. Fleischmann et al., "A New Approach to Fully Unstructured Three–dimensional Delaunay Mesh Generation with Improved Element Quality", *Proc. SISPAD*, Sep. 1996, pp. 129–130.

* cited by examiner

Primary Examiner—Cliff N. Vo
(74) Attorney, Agent, or Firm—Sughrue, Mion, Zinn Macpeak & Seas, PLLC

(57) ABSTRACT

In a method of generating a three-dimensional Delaunay tetrahedral mesh, failure to generate the tetrahedral mesh can be avoided through use of a simple algorithm not accompanied by correction of the tetrahedral mesh. The advancing front method of giving grid points in advance is employed as the basic algorithm. First a triangular mesh is generated on the surface of an analytic domain and the analytic domain is filled in by successively extracting tetrahedral elements having each triangular surface of the triangular mesh as a side face thereof. In order to avoid occurrence of a polyhedral area that cannot be partitioned into tetrahedral elements at this time, triangular surfaces which may possibly give rise to a polyhedron that cannot be partitioned into tetrahedral elements are temporarily stored and processing deferred. Even if a state exists in which six or more grid points lie on the surface of a sphere that does not internally enclose a grid point, the interior of this convex hull domain is tetrahedralized consistently.

5 Claims, 10 Drawing Sheets

FIG. 10 (a) PRIOR ART
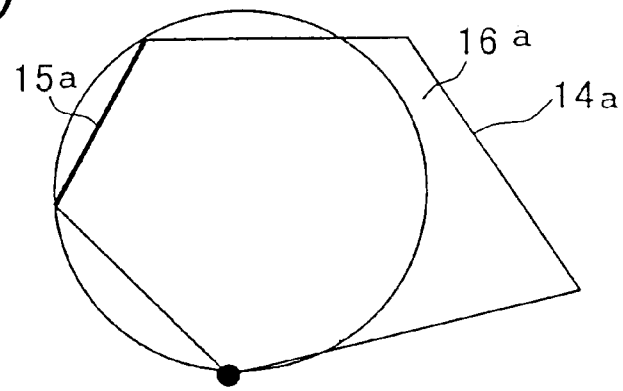
FIG. 10 (b) PRIOR ART
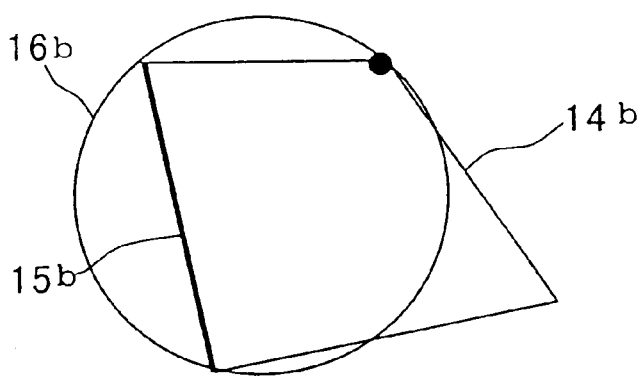
FIG. 10 (c) PRIOR ART
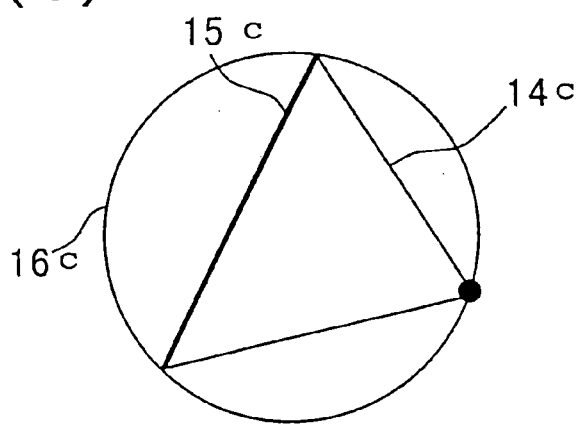

TETRAHEDRAL MESH GENERATION AND RECORDING MEDIUM STORING PROGRAM THEREFOR

FIELD OF THE INVENTION

This invention relates to a system and method for generating a three-dimensional discretized mesh and, more particularly, to a system and method for generating a three-dimensional discretized mesh used to solve partial differential equation numerically by computer.

BACKGROUND OF THE INVENTION

Description of the Related Art

The following known literature relating to the above-mentioned technology will be referred to below:

(1) Japanese Patent Kokai Publication No. JP-A-7-121579

(2) Japanese Patent Kokai Publication No. JP-A-8-329284

(3) M. S. Mock, "Tetrahedral elements and the Scharfetter-Gummel Method," Proc. NASECODE IV, June, 1985, pp. 36–47

(4) P. Fleischmann and S. Selberherr, "A New Approach to Fully Understand Unstructured Three-dimensional Delaunay Mesh Generation with Improved Element Quality," Proc. SISPAD, September, 1996, pp. 129–130

Solving partial differential equations numerically involves generating a discretized mesh which tesselates an analytic domain into minute domains, deriving simultaneous equations which approximate the original partial differential equations and then solving the simultaneous equations. Methods of deriving the simultaneous equations include the finite-element method and the finite-difference method, with the particular method that is used depending upon the nature of the problem to be solved. For example, in the case of a device simulator which computes the electrical characteristic of a semiconductor device through use of a computer, extensive use is made of a method referred to as the control volume method or box integration method derived as a finite-element method. The method defines a minute domain allotted to each discretized grid point and uses a trial function that has a value of 1 within a minute domain and a value of 0 elsewhere.

A method of generating a three-dimensional discretized mesh used in discretized approximation of an equation is set forth in say of Japanese Patent Kokai Publication No. JP-A-7-121579, which deals with the finite-element method. Japanese Patent Kokai Publication No. JP-A-7-121579 proposes a finite-element mesh generation method that includes forming intermediate mesh by partitioning a three-dimensional model to be analyzed into the finite elements of a plurality of tetrahedrons and the finite elements of a pentahedron and/or hexahedron, subdividing each finite element of this intermediate mesh by the finite elements of a hexahedron and forming the entire analytical model as a hexehedral mesh.

When numerical analysis is performed using the control volume method, however, the numerical analysis is rendered unstable if the discretized mesh has not undergone tesselation referred to as Delaunay partitioning. Ordinarily, therefore, it is not possible to apply a mesh generation method for the finite-element method that does not take the nature of such a mesh into account.

Examples of a mesh generation method for a case where a three-dimensional control volume method is used are described in "Tetrahedral elements and the Scharfetter-Gummel Method," Proc. NASECODE IV, pp. 36–47, June 1985 by S. Mock and in the Japanese Patent Kokai Publication No. JP-A-8-329284. These methods involve repeating an operation which includes first creating a Delaunay mesh that includes an analytic domain and then adding a single grid point to this mesh to locally correct the mesh. The correction is carried out in such a manner that the Delaunay-partitioned nature of the mesh will not be lost.

In order to perform the tetrahedral mesh revision by this method, it is necessary to delete mesh elements together with their connecting information and set the connecting information again correctly. Developing a program for executing such processing correctly requires great care and is not easy.

A method of obtaining a Delaunay-partitioned mesh by the advancing front method is disclosed as a method through which the tetrahedral mesh correction operation can be avoided. For example, see "A New Approach to Fully Understand Unstructured Three-dimensional Delaunay Mesh Generation with Improved Element Quality," Proc. SISPAD, pp. 129–130, September, 1996.

An overview of the conventional advancing front method will be described with reference to FIGS. 8 and 9. FIG. 8 is a block diagram illustrating the relationship between processing content and control data in the conventional advancing front method, and FIG. 9 is a flowchart illustrating the processing procedure of the conventional advancing front method.

In the flowchart of FIG. 9, first the surface of an analytic domain is partitioned into a triangular mesh at step S1. Next, at step S2, the mesh surfaces of the triangular mesh created at step S1 are registered as unprocessed triangular surfaces. Step S3 is iterated as long as an unprocessed surface exists. Step S3 includes selecting one unprocessed triangular surface and extracting a tetrahedral element having this triangular surface as one side face thereof. (This step corresponds to means 7 in FIG. 8 for extracting a tetrahedral element having a triangular surface as one side face.)

In order to construct the tetrahedral element, a grid point must be given in addition to the triangular surface. Grid points given inside the analytic domain also are utilized in addition to the grid points of the triangular mesh on the domain surface. The grid points inside the analytic domain can all be given in advance or the grid points can be generated at appropriate positions when the tetrahedral element is extracted.

As the extraction of the tetragonal elements proceeds, the domain that is to be meshed becomes smaller in size. The list of unprocessed triangular surfaces is updated at step S3 of FIG. 9 in such a manner that unprocessed triangular surfaces become a set of triangular surfaces on the periphery of the domain that is to be meshed. In other words, among side faces of a tetrahedral element that has been extracted, surfaces that have been registered in the list of unprocessed surfaces are deleted from the list and triangular surfaces that have been created anew are registered in the list.

FIG. 8 shows the relationship between means provided in a data processing unit 1 and data preserved in a memory device 2 in order to execute the processing described above. This advancing front scheme comprises the processing unit 1, the storage (memory) device 2 and a storage medium 3. The data processing unit 1 includes means 4 for generating a triangular mesh on a surface, initial setting means 5 for setting the surface of a domain on which a mesh is to be generated, and means 7 for extracting a tetrahedron having a triangular surface as one side face thereof. The storage device 2 includes a storage unit 9 for storing a three-dimensional analytic domain, a storage unit 10 for storing a triangular surface mesh, a storage unit 11 for storing an unprocessed triangular surface, and a storage unit 13 for storing a tetrahedral mesh.

In semiconductor simulation, an analytic domain almost always comprises a plurality of areas of different material qualities. This can be dealt with by generating a triangular mesh on the boundary surface between different materials and then applying the processing from step S2 (FIG. 9) onward to each domain of each material.

An overview of an approach for applying the advancing front method to the generation of a Delaunay mesh will be described with reference to FIGS. 10(A)–10(C). For the sake of simplicity, we will discuss the case of a two-dimensional example in which a grid point is not placed inside a domain for which a mesh is to be generated. A property of a Delaunay mesh is that grid points are not enclosed by the circumcircle of a mesh element. The advancing front method is applied as set forth below utilizing this property.

In FIG. 10(A) it is assumed that a grid point exists only a vertex of a polygon of a domain 14a for which a mesh is to be generated. One side 15a on the perimeter of the domain 14 is selected and a grid point (the point at the position of the black circle) that constructs a circle 16a which does not internally contain grid points is found. A triangular element is extracted using (containing) this grid point and the side 15a.

When this is done, the domain 14a to be meshed is updated to a domain 14b, then one side 15b on the perimeter thereof is selected and a triangular element is extracted in similar fashion, as shown in FIG. 10(b). This is iterated until the domain 14c for which a mesh is to be generated vanishes, as illustrated in FIG. 10(C) (i.e., the domain 14c now becomes a triangular element with a selected side 15c and a circle 16c).

Problems Encountered in the Art

In the course of investigation toward the present invention the followings problems have been encountered.

In the case of three dimensions, a grid point that constructs a circumsphere which does not internally contain grid points is found on the triangular surface of the outer periphery of the domain for which the mesh is to be generated.

Processing can be executed in a similar manner also in a case where a grid point is placed within an analytic domain beforehand. In a case where a grid point is generated when a tetrahedral element is extracted, care must be taken so as not to position the grid point within a circumcircle or circumsphere of a mesh element that has already been generated. However, such processing is not impossible. Nevertheless, in a case where decision processing is to be included or any position whatsoever falls within a circumcircle or circumsphere, this is not an appropriate method of computation when one considers that control is performed so as not to become trapped in an endless loop in an effort to generate points. In other words, if the advancing front method is to be used, then grid points should be given in advance.

Thus, a problem which arises in a case where the advancing front method is utilized in generation of a three-dimensional tetrahedral mesh is that a state in which tetrahedral elements cannot be extracted can occur.

FIG. 3 illustrates a triangular prism domain that has not been partitioned into tetrahedral elements, the domain being bounded entirely by triangular surfaces. In this case, intersection of grid sides occurs regardless of how the tetrahedron is extracted. This condition is capable of occurring in a case where six or more points are located on the same spherical surface and, moreover, four or more points are located on the same plane, as in the domain of a triangular prism or domain of a rectangular prism.

If five or more points are located on a surface of sphere that does not internally contain grid points in a case where the control volume method is used, it is unnecessary to generate the side of a grid that passes through the interior of the convex hull of these grid points, and the convex hull can be treated as one element. If this is done, however, a polyhedral element having an arbitrary number of sides will be generated. This will necessitate a characteristic analyzer and an analytical result display unit which can manage these elements. This is extremely inconvenient. Since it is possible in principle to perform tetrahedralization without causing the intersection of the sides of grids, finding how to perform such partitioning is appropriate.

SUMMARY OF THE DISCLOSURE

Accordingly, an object of the present invention is to provide a method of generating a discretized mesh using the advancing front method, which method is capable of preventing the occurrence of domains such as that illustrated in FIG. 3.

Another object of the present invention is to provide a system for generating a tetrahedral mesh in a method of generating a three-dimensional Delaunay tetrahedral mesh, this being possible through simple computation not accompanied by correction of the tetrahedral mesh, the system further making it possible to avoid failure to generate the tetrahedral mesh.

Further objects of the present invention will become apparent in the entire disclosure.

According to a first aspect of the present invention, there is provided a system for generating a tetrahedral mesh which discretizes a three-dimensional analytic domain in order to solve partial differential equations numerically. The system uses the advancing front method for generating the tetrahedral mesh by iterating a procedure which includes generating a triangular mesh on the surface of the domain in advance, extracting a tetrahedral element by giving a grid point serving as a vertex of a triangular surface of the triangular mesh, and extracting tetrahedral elements again from the three-dimensional domain that remains by the same method. The system comprises:

(a) means for excluding from processing and for temporarily storing a specified triangular surface from triangular surfaces that have not yet been subjected to tetrahedral-element extraction processing, and (b) means which, if a plurality of grid points have become candidate points when a tetrahedral element is extracted using a certain triangular surface, is for partitioning a convex hull domain, which is constituted by the candidate points and the triangular surface, into tetrahedral elements consistently.

According to the present invention, the data processing apparatus shown in FIG. 8, which employs the conventional advancing front method, is additionally provided with means (6 in FIG. 1) for temporarily saving specified triangular surfaces from among triangular surfaces not yet processed, and means (8 in FIG. 1) for partitioning a convex hull domain into tetragonal elements.

All of these means are necessary to provide an effect which assures that a triangular surface will be partitioned appropriately before a state of the kind shown in FIG. 3 is attained. In the case of the domain of the triangular prism shown in FIG. 3, the rectangular side face on the front side has been partitioned by the diagonal line connecting the vertices at the upper left and lower right. It will be understood that if this rectangular side face has been partitioned by one diagonal, then the domain of the triangular prism can be partitioned into tetrahedral elements (termed as "tetrahedralized") without difficulty.

FIG. 4 illustrates the condition before this rectangular side face is partitioned. Here either of grids points A or B can be used as a vertex in a case where a tetrahedral element is extracted using a triangular surface PQR. If the point A is selected, however, the state shown in FIG. 3 is obtained. However if tetrahedralization is applied to either triangular surface on the ends of the triangular prism domain before the triangular surface PQR is processed, then there will be generated a tetrahedral element that allows a grid side connecting the grid points Q and B to be obtained. In other words, though the method of partitioning the rectangular side face ABRQ has arbitrariness when viewed from the side of triangle PQR, it is uniquely decided when viewed from the opposite side.

Accordingly, a triangular surface for which the tetrahedral element to be extracted is not uniquely decided is saved temporarily. If priority is given to the processing of a triangular surface for which the tetrahedral element to be extracted is uniquely decided, the situation described above can be avoided.

However, this processing alone is not sufficient. In a case where a grid point P lies on the circumcircle of the domain of a triangular prism, as shown in FIG. 5, all of the triangular surfaces bounding this domain possess arbitrariness in terms of extracting tetrahedral elements. From which surface processing should be executed is not clear. In such case, the state shown in FIG. 3 will result if a tetrahedron is extracted using the grid point A in regard to the triangular surface PQR.

In order to prevent this, it is necessary to provide means for partitioning the entire convex hull domain, which is constituted by the triangular surfaces and vertex candidates, consistently. The simplest method is to examine thoroughly possible partitioning methods until partitioning can be achieved.

According to a second aspect, there is provided a method of generating a tetrahedral mesh using, as a basic algorithm, the advancing front method of giving grid points in advance. The method comprises the following steps:

(a) first generating a triangular mesh on the surface of an analytic domain;

(b) registering the mesh surfaces of the generated triangular mesh as unprocessed triangular surfaces; and (c) in order to avoid occurrence of a polyhedral area that cannot be partitioned into tetrahedral elements when one of the unprocessed triangular surfaces is selected and an operation is performed to extract a tetrahedral element having this one triangular surface as a side face thereof, temporarily saving a triangular surface for which a tetrahedral element to be extracted is not uniquely decided, and deferring processing of a triangular surface which may possibly give rise to a polyhedron that cannot be partitioned into tetrahedral elements:

The method further comprises the steps of (d) in a case where a plurality of grid points become candidate points when a tetrahedral element is extracting using a certain triangular surface, partitioning a convex hull domain, which comprises the triangular surface and the candidate points, into tetrahedral elements, and, in all other cases, extracting, in the usual manner, a tetrahedral element having the triangular surface as a side face thereof; and (e) repeating processing from said step (c) in a case where there is an unprocessed triangular surface, and if there is a temporarily saved triangular surface in a case where there is no unprocessed triangular surface, executing processing from said step (c) using said temporarily saved triangular surface as an unprocessed triangular surface.

According to a third aspect, there is provided an apparatus generating a three-dimensional discretized mesh.

The apparatus comprises means for generating a triangular mesh on the surface of an analytic domain, filling in the analytic domain by successively extracting tetrahedral elements having each triangular surface of the triangular mesh as a side face thereof, by using the advancing front method, which gives grid points in advance, as a basic algorithm, and, in order to avoid occurrence of a polyhedral area that cannot be partitioned into tetrahedral elements at this time, using means which temporarily stores triangular surfaces to defer processing of a triangular surface which may possibly give rise to a polyhedron that cannot be partitioned into tetrahedral elements; and means which, even if a state exists in which six or more grid points lie on a spherical surface that does not internally enclose a grid point, tetrahedralizes the interior of this convex hull domain consistently.

According to a fourth aspect, there is provided a recording medium recorded therein a program executing or processing the method, system, and any of the steps and processings aforementioned aspects of the present invention by computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a diagram showing a two-dimensional example illustrating the manner of processing for the advancing front method according to the prior art.

DESCRIPTION OF THE PREFERRED EMBODIMENTS

Figure 1:
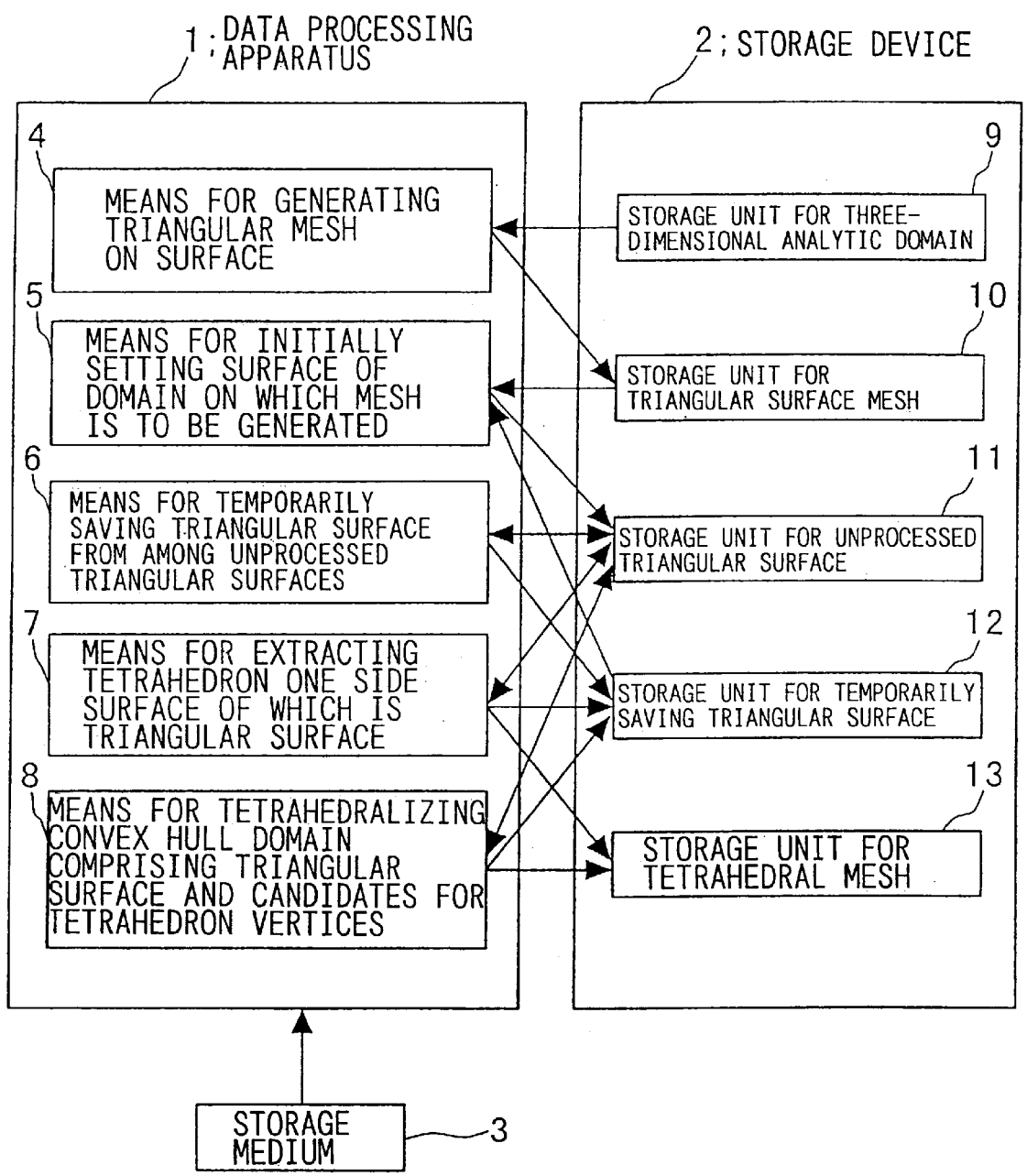
FIG. 1 is a block diagram showing an arrangement of a mode of practicing the present invention.

Modes for practicing the present invention will be described below. FIG. 1 is a block diagram showing the arrangement of a mode of practicing the present invention, and FIG. 2 is a flowchart for describing the mode of practicing the invention.

Figure 2:
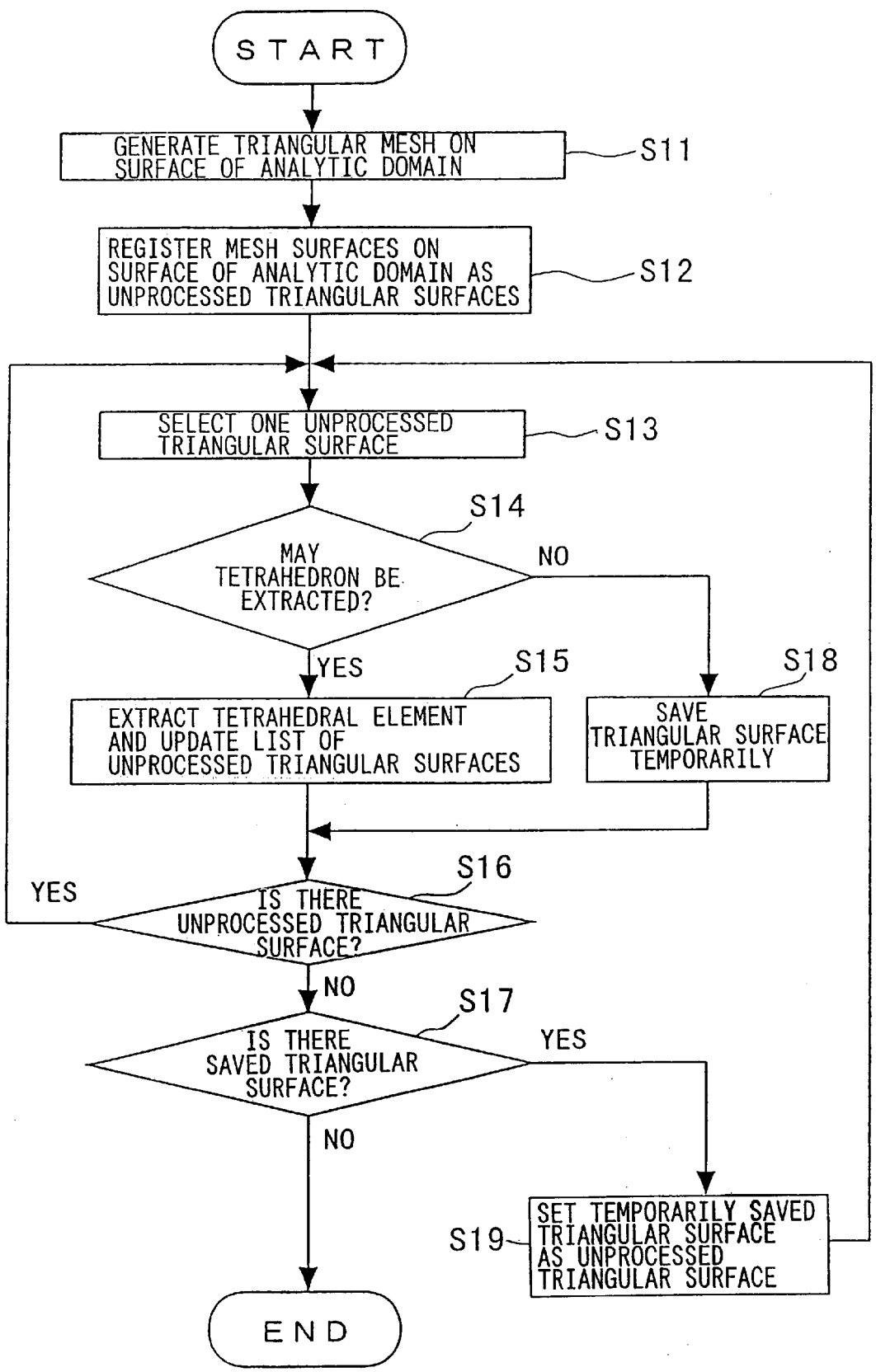
FIG. 2 is a flowchart illustrating a processing procedure according to the mode of practicing the invention.
Figure 9:
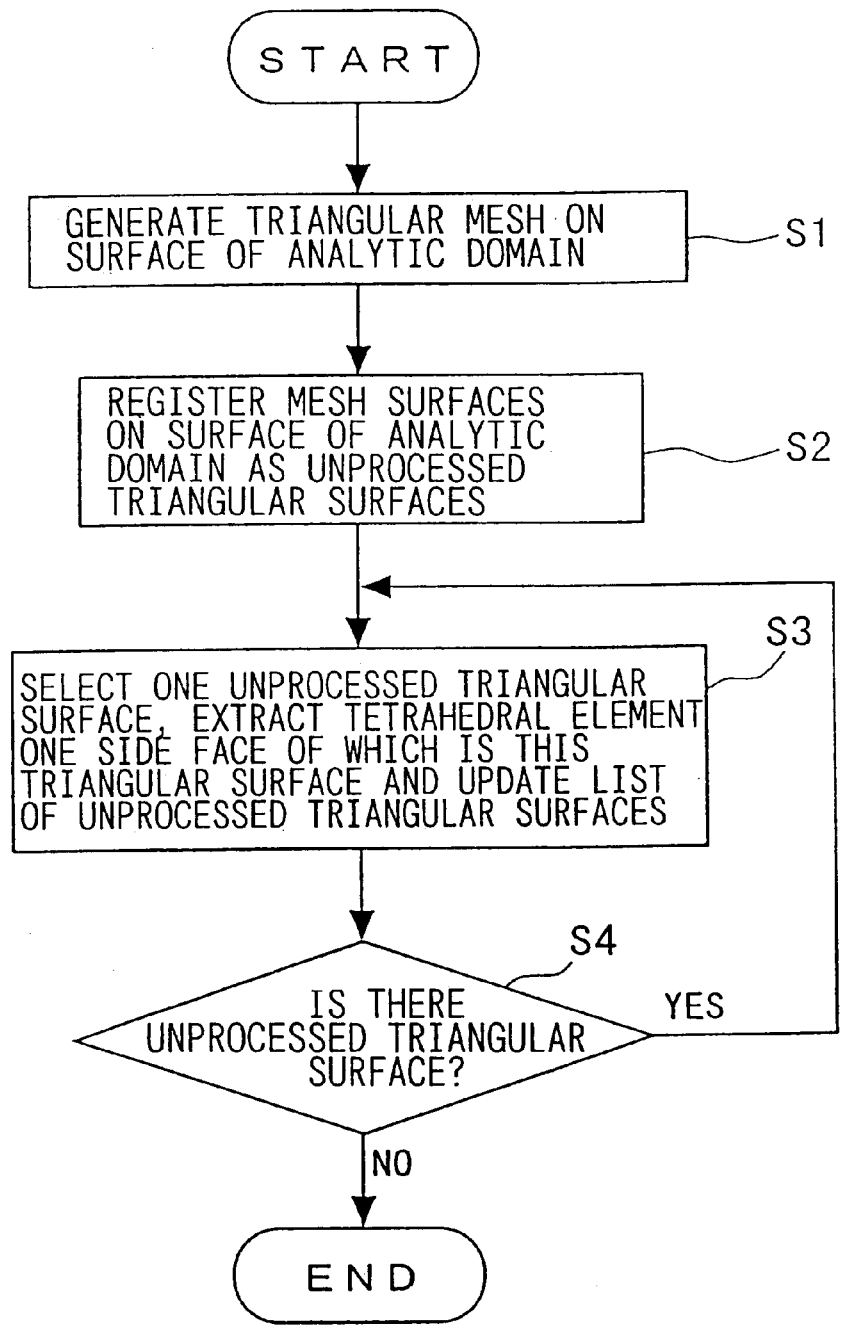
FIG. 9 is a flowchart illustrating a processing procedure for the advancing front method according to the prior art.

In FIG. 2, a step S11 for generating a mesh on the boundary surface of an analytic domain and a step S12 for registering unprocessed triangular surfaces are the same as the corresponding steps (steps S1 and S2 in FIG. 9) of the conventional advancing front method.

Step S13 in FIG. 2 calls for one unprocessed triangular surface to be selected. This is followed by step S14, at which it is determined whether a tetrahedron should be extracted. Though a tetrahedral element giving a circumsphere that does enclose grid points therewithin is extracted in regard to a triangular surface, there are cases where two or more grid points that can be the vertices of the triangular surface exist. When four or more points inclusive of the vertices of the triangular surface lie on the same plane in such case, methods of partitioning the polygon formed by these points involve a number of possibilities.

When the polygonal surface is part of a convex hull domain comprising triangular surfaces and candidates for vertices, control proceeds from step S13 to step S18 to avoid the extraction of a tetrahedral element from the triangular surface. At step S18 this triangular surface is excluded from the unprocessed triangular surfaces and is temporarily saved using the means 6 of FIG. 1, which is for saving certain triangular surfaces of unprocessed triangular surfaces.

If it is found at step S14 that the above-mentioned conditions do not apply to the selected triangular surface, then a tetrahedral element is extracted at step S15. However, if a plurality of candidates for vertices exist, the entire convex hull domain comprising the triangular surfaces and candidates for the vertices of the tetrahedron is partitioned into tetrahedra using the means 8, which is for partitioning a convex hull domain comprising the triangular surface and vertex candidates into tetrahedra. If this is not the case, then a tetrahedron is extracted in the usual fashion using the means 7, which extracts a tetrahedron one side surface of which is the triangular surface.

Figure 4:
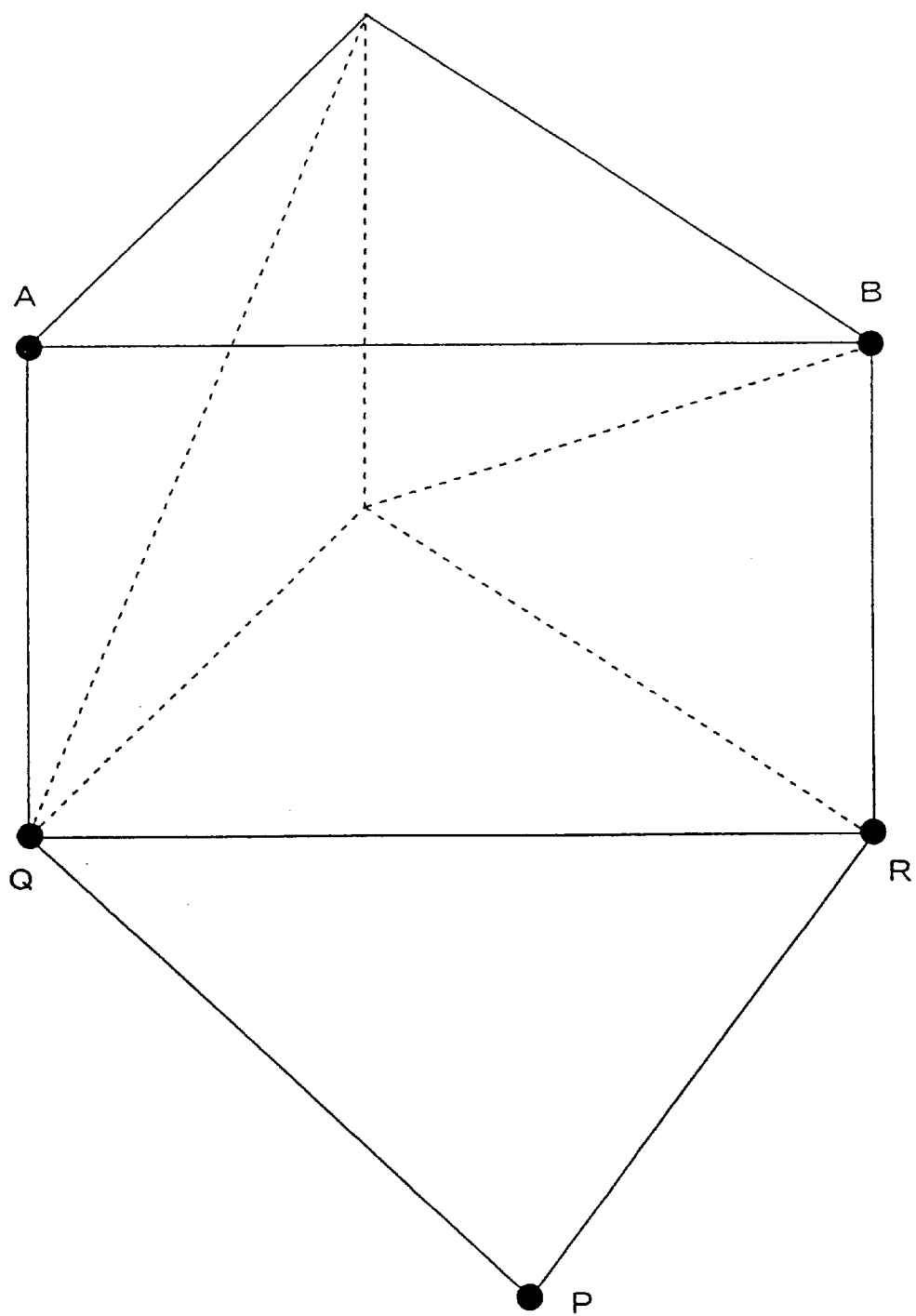
FIG. 4 is a diagram showing an example of a state in which means for temporarily saving a triangular surface from among unprocessed triangular surfaces is required in an embodiment of the invention.
Figure 5:
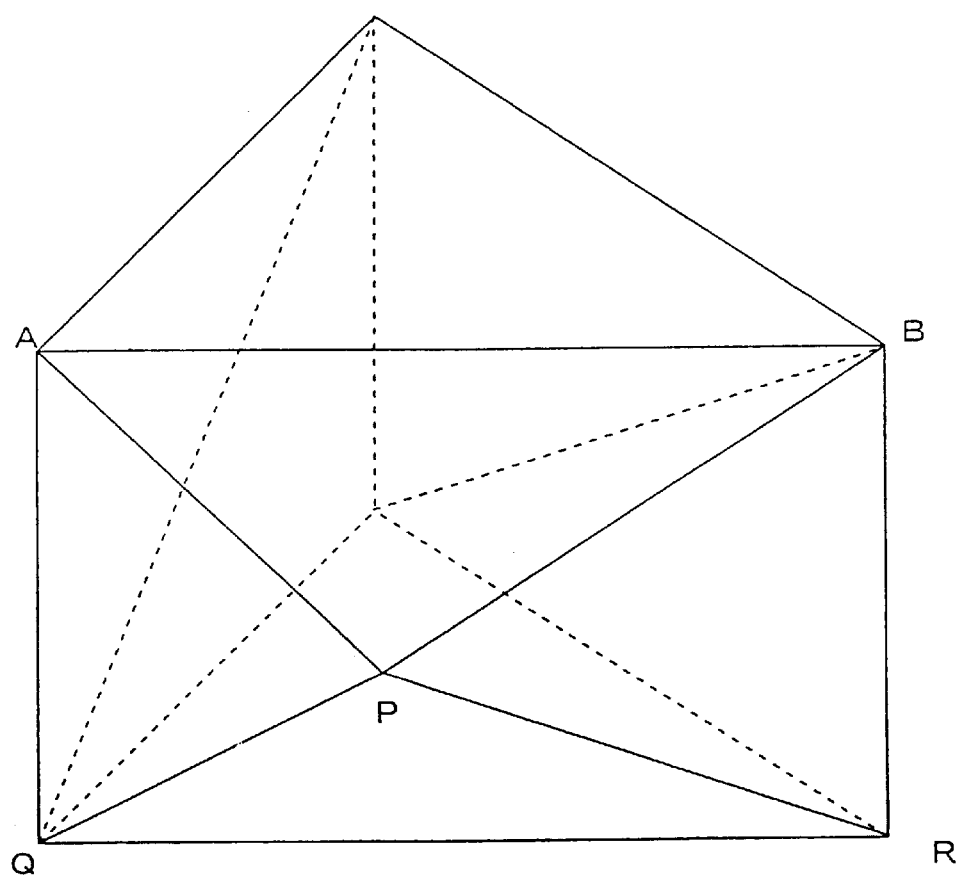
FIG. 5 is a diagram showing an example of a state which necessitates means for tetrahedralizing a convex hull domain, which comprises a triangular surface and vertex candidates of a tetrahedron.

For example, in a case where the triangular surface PQR in FIG. 4 is the surface to be processed, a plurality of vertex candidates, namely A and B, exist, the points A, B, Q, R lie on the same plane and, moreover, the rectangle defined by these four points is part of a convex hull constructed by the points A, B, Q, R. Accordingly, this triangular surface (PQR) is temporarily saved. On the other hand, if another triangular surface is the surface to be processed, a tetrahedron to be extracted without the sides of grids intersecting is uniquely decided. In other words, since there will be only one candidate for a vertex, a tetrahedron is extracted by the ordinary extracting means (7 in FIG. 1). Since a grid side connecting the grid points Q and B is constructed at this time, a tetrahedral element is extracted using point B when the triangular surface PQR becomes the surface to be processed.

If the tetrahedron has been constructed, then the List of unprocessed surfaces is updated just as in the case of the ordinary advancing front method. If the side face of a tetrahedron that has been extracted is an unprocessed surface, it is deleted from the list of unprocessed surfaces. If the side face is a surface that has been saved, then it is deleted from the list of saved surfaces.

If processing of the triangular concerned surface is finished, then it is determined at step S16 in FIG. 2 whether unprocessed surfaces remain. If the answer is "YES", then control returns to step S13. If the answer is "NO", then it is determined at step S17 whether a saved surface exists. If the answer is "NO" as well, then processing is terminated. If a saved surface exists, however, then control proceeds to step S19, at which all temporarily saved surfaces are re-set as unprocessed surfaces. Control then returns to step S13. It is assumed that the processing of step S19 is executed by the initial setting means 5, which initially sets the surface that is to be meshed.

A case is conceivable in which, despite the fact that all temporarily saved surfaces have been re-registered as unprocessed surfaces, some surface will be temporarily saved again and processing will not proceed. Such a state can be sensed easily if appropriate use is made of a flag or the like. If such a state is sensed, a tetrahedron is forcibly extracted from a certain triangular surface. More specifically, after only one surface of saved surfaces is registered as an unprocessed surface at step S19 in FIG. 2 and control returns to step S13, the decision of step S14 is skipped and the tetrahedron extraction of step S15 is performed using the means for partitioning a convex hull domain. Here a flag is reset and subsequent processing is then executed again in accordance with the ordinary processing flow. This makes it possible to avoid an endless loop.

With this mode of processing, the forcible extraction of a tetrahedron is limited to a case where all unprocessed surfaces that have been reset are saved surfaces, i.e., a case where there is not a single triangular surface judged to be acceptable for extraction of a tetrahedron. In this sense the method is stable in terms of the algorithm. However, a situation tends to arise in which the same triangular surface is evaluated again and again at step S14, saved at step S18 and restored to an unprocessed surface at step S19. This leads to the possibility of prolonged processing time.

Figure 3:
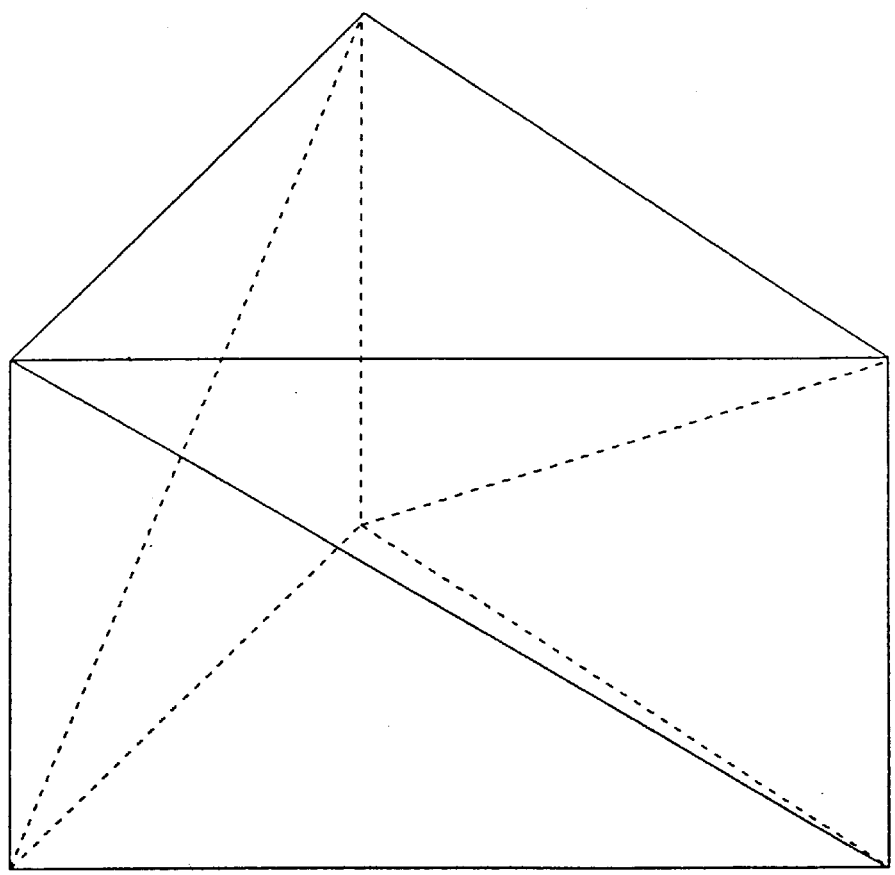
FIG. 3 is a diagram showing an example of a polyhedral domain that cannot be tetrahedralized.

In order to shorten processing time, an approach somewhat different from that cited above also is conceivable. The processing flow is substantially the same except that the condition "surface has not been saved more than a certain number n of times" is added on as the condition for saving a surface at step S14 in FIG. 2. The number of times may be counted at step S18. Further, since an endless loop is avoided by the upper limit of the number of times, it will suffice to always reset all temporarily saved surfaces as unprocessed surfaces at step S19. Though the smaller n is made, the shorter processing time becomes, there will be a correspondingly greater possibility that a state in which tetrahedralization cannot be performed (FIG. 3) will occur. However, a situation in which such a condition arises is one where grid points are arrayed in an orderly manner; the situation almost never occurs in a random array of grid points. Depending upon the method in which grid points are arrayed, therefore, there are instances where satisfactory results are obtained even when n is equal to one.

With reference again to FIG. 1, a storage medium 3 is provided in this mode of practicing the invention. A mesh generation program is recorded on the storage medium 3 and the program is read from the storage medium 3 to the data processing apparatus 1 to control the apparatus. The data processing apparatus 1 executes processing according to this mode, which has been described with reference to FIGS. 1 and 2, by control in accordance with the mesh generation program.

DETAILED DESCRIPTION OF THE PREFERRED EMBODIMENTS

Figure 6:
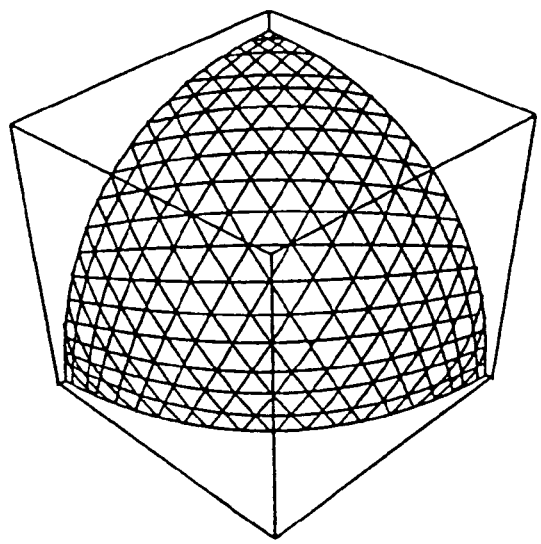
FIG. 6 is a diagram useful in describing a first embodiment of the present invention, the diagram illustrating an analytic domain and a tetrahedral mesh on the surface thereof.

Preferred embodiments of the present invention will now be described. A first embodiment applies the present invention to a case where a tetrahedral mesh is generated inside a domain which is one-eighth of a spherical domain, as illustrated in FIG. 6.

First, the mesh illustrated is used as a triangular mesh applied to the surface of an analytic domain. The internal grid points are arrayed before and set forth below. First, a rectangular area which includes the analytic domain is decided and this area is subdivided into minute rectangles recursively.

The reference for performing subdivision is as follows: "If the rectangular area internally encloses two or more triangular grid points on the surface of the analytic domain, then the rectangle is bisected in each direction (3 directions) to subdivide the rectangle into eight rectangles". Further, it is so arranged that the subdivision levels of mutually adjacent rectangles differ by only one at most.

Among the rectangles thus obtained, those outside the analytic domain and those near the surface of the analytic domain, or more specifically, those which intersect the smallest circumsphere of a triangular surface of the triangular mesh, are eliminated. The method of the present invention is applied to the tetrahedralization of each remaining rectangle and to the tetrahedralization of the domain between the set of rectangular areas and the surface of the analytic domain. The condition "one or more have not been saved" is added on at step S14 as the condition for saving surfaces.

One hundred examples were examples where examined while changing the number of partitions of the triangular mesh on the surface. With the conventional advancing front method, tetrahedral meshes could be generated in only 38 examples. According to the method of this embodiment, however, tetrahedral meshes could be generated in all cases. Further, whereas the average processing time per generated tetrahedron was 1 according to the prior-art method, the relative value according to this embodiment was 1.085. This is a rate of increase in processing time of less than 10%.

Figure 7:
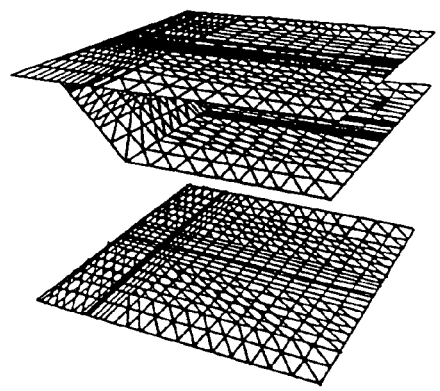
FIG. 7 is a diagram useful in describing a second embodiment of the present invention, in which (a) is a view showing a tetrahedral mesh that has been generated on the boundary surface of a device structure, (b) is a view showing a tetrahedral mesh formed in an insulating film layer, and (c) is a view showing a tetrahedral mesh formed in a semiconductor layer.
Figure 7:
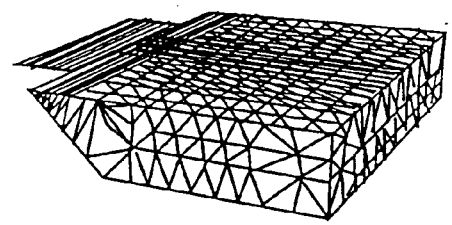
Figure 7:
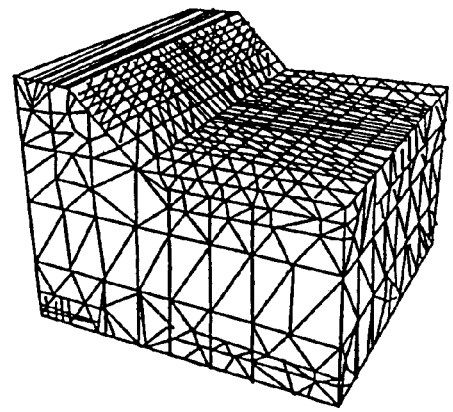
Figure 8:
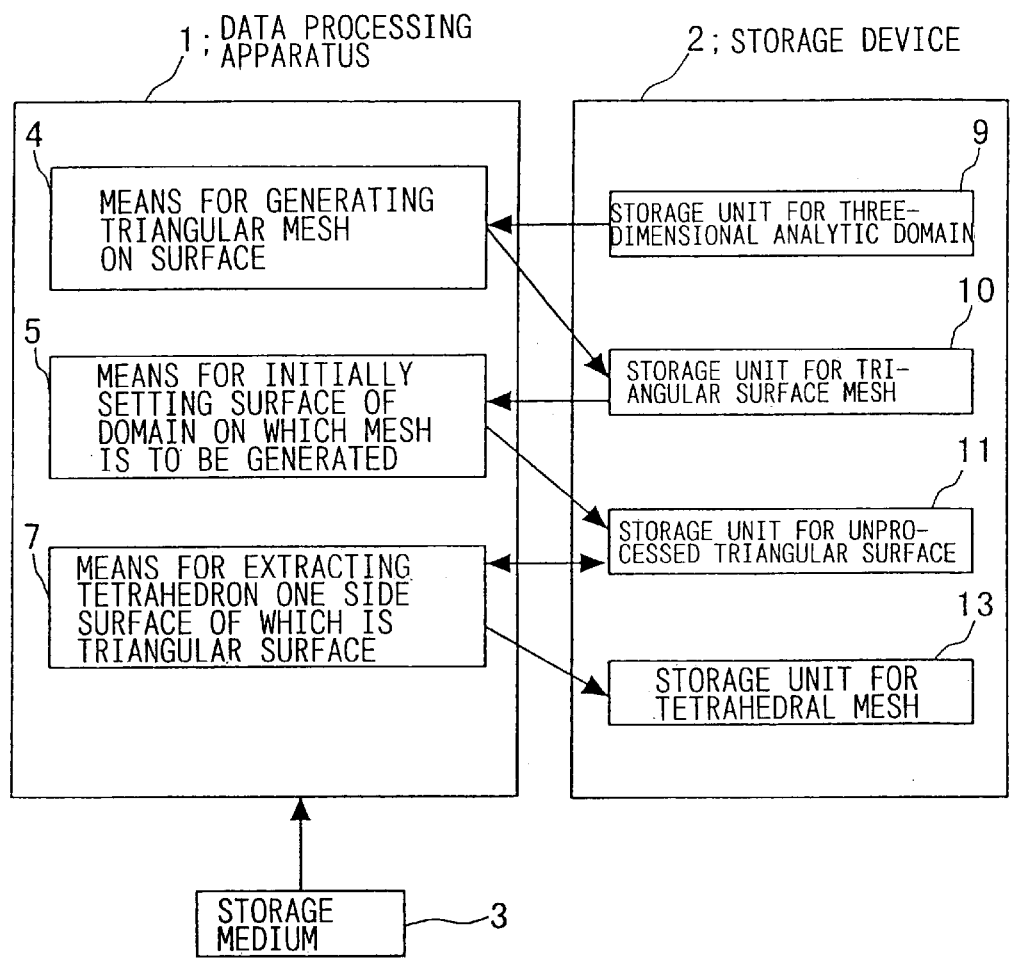
FIG. 8 is a block diagram showing the construction of an advancing front scheme according to the prior art.

FIG. 7 illustrates a second embodiment in which the present invention is applied to mesh generation in regard to the structure of a semiconductor device. In FIG. 7, (a) illustrates triangular meshes generated on the boundary surfaces of materials. From the top, the materials are an air or electrode layer, an insulating film layer, a semiconductor layer and an electrode layer. The layers which require the generation of tetrahedral meshes are the insulating film layer and the semiconductor layer. Internal grid points are decided and a tetrahedral mesh generated for each layer by a method of recursively partitioning squares in a manner similar to the above-mentioned embodiment pertaining to a domain which is one-eighth of a sphere. The tetrahedral mesh of the insulating film layer is shown in (b) of FIG. 7, and the tetrahedral mesh of the semiconductor layer is illustrated in (c). Thus the invention can be applied to the structures of many materials without difficulty. The generation of meshes having a number of grid points fully capable of actual analysis has been achieved, with the number of grid points being on the order of 20,000.

One effect of the present invention is that it is possible to realize a stable operating method of Delaunay meshing achieved by successively creating tetrahedra without correcting tetrahedral meshes. Unlike the case with the prior art, it is unnecessary to preserve the complex connectivity relationship of grids. This facilitates program development.

Another effect of the present invention is that the tradeoff between operation stability and processing speed can be adjusted in conformity with method in which grid points to be applied are arrayed.

As many apparently widely different embodiments of the present invention can be made without departing from the spirit and scope as disclosed herein and defined in the appended claims, it is to be understood that the invention is not limited to the specific embodiments thereof.

What is claimed is:

1. A system for generating a tetrahedral mesh which discretizes a three-dimensional analytic domain in order to solve partial differential equations numerically, the system using the advancing front method for generating the tetrahedral mesh, the system comprising:

an excluder for excluding a specified triangular surface which may give rise to a polyhedron that cannot be partitioned into tetrahedral elements from a plurality of triangular surfaces that have not yet been subjected to tetrahedral-element extraction processing;

a storer for temporarily storing the specified triangular surface; and a partitioner for partitioning a convex hull domain into tetrahedral elements consistently wherein the convex hull domain is constituted by a certain triangular surface and a plurality of grid points that become candidate points when a tetrahedral element is extracted using the certain triangular surface.

2. A computer program product for enabling a computer to generate a tetrahedral mesh which discretizes a three-dimensional analytic domain in order to solve partial differential equations numerically, wherein the advancing front method is used for generating the tetrahedral mesh, the computer program product comprising software instructions for enabling a computer system to perform predetermined operations and a computer readable medium bearing the software instructions;

the predetermined operations including:

excluding from processing and temporarily storing a specified triangular surface which may give rise to a polyhedron that cannot be partitioned into tetrahedral elements from a plurality of triangular surfaces that have not yet been subjected to tetrahedral-element extraction processing; and partitioning a convex hull domain into tetrahedral elements consistently, wherein the convex hull domain is constituted by a certain triangular surface and a plurality of grid points that have become candidate points when a tetrahedral element is extracted using the certain triangular surface.

3. A method of generating a tetrahedral mesh using the advancing front method of giving grid points in advance, the method comprising:

(a) generating a triangular mesh on the surface of an analytic domain;

(b) registering the mesh surfaces of the generated triangular mesh as unprocessed triangular surfaces;

(c) temporarily saving a triangular surface for which a tetrahedral element to be extracted is not uniquely decided, and deferring processing of a triangular surface, thereby avoiding any occurrence of a polyhedral area that cannot be partitioned into tetrahedral elements when one of the unprocessed triangular surfaces is selected and an operation is performed to extract a tetrahedral element having this one triangular surface as a side face thereof;

(d) determining if a plurality of grid points become candidate points when a tetrahedral element is extracting using a certain triangular surface, and if true, partitioning a convex hull domain that comprises the triangular surface and the candidate points into tetrahedral elements, and if not true, extracting a tetrahedral element having the triangular surface as a side face thereof; and (e) determining if there is an unprocessed triangular surface, and if true, repeating the processing from step (c), and if there is no unprocessed triangular surface and there is a temporarily saved triangular surface, executing processing from step (c) using the temporarily saved triangular surface as an unprocessed triangular surface.

4. An apparatus generating a three-dimensional discretized mesh, comprising:

a generator for generating a triangular mesh on the surface of an analytic domain, and filling in the analytic domain by successively extracting tetrahedral elements having each triangular surface of the triangular mesh as a side face thereof by using the advancing front method, which gives grid points in advance;

a storer for temporarily storing triangular surfaces in order to defer processing of a triangular surface which may give rise to a polyhedron that cannot be partitioned into tetrahedral elements, thereby avoiding the occurrence of a polyhedral area that cannot be partitioned into tetrahedral elements;

a tetrahedralizer that consistently tetrahedralizes an interior of a convex hull domain defined by a plurality of grid points that lie on a spherical surface that does not internally enclose a grid point.

5. The apparatus generating a three-dimensional discretized mesh as claimed in claim 4, wherein the plurality of grid points comprises at least six grid points.

* * * * *